INVENTOR
ALFRED LANZ
By Irwin S. Thompson
ATTY.

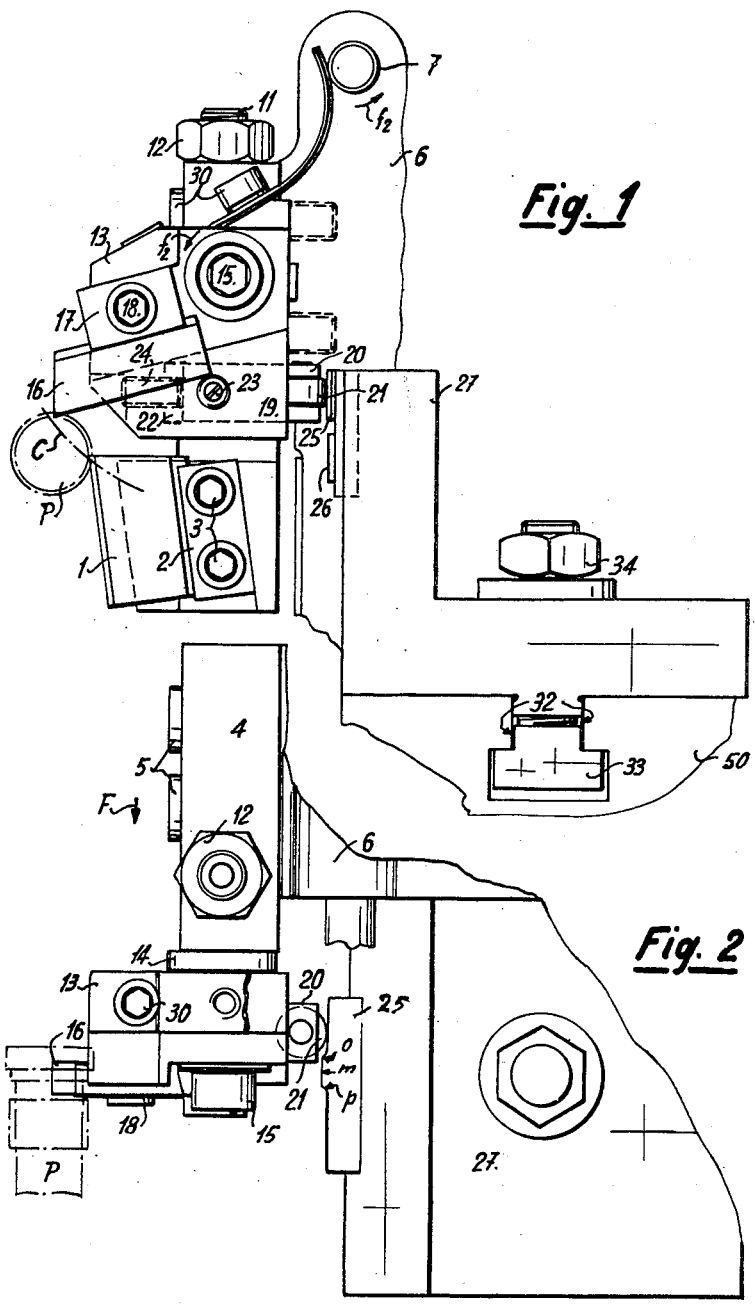

INVENTOR
ALFRED LANZ
BY Irwin S. Thompson
ATTY.

United States Patent Office 3,106,727
Patented Oct. 15, 1963

3,106,727
THREAD CUTTING LATHE WITH DEBURRING CUTTER ACTUATED AT START AND END OF THREADING OPERATION
Alfred Lanz, Petit-Lancy, Geneva, Switzerland, assignor to Tarex S.A., Geneva, Switzerland, a corporation of Switzerland
Filed Jan. 15, 1960, Ser. No. 2,614
Claims priority, application Switzerland, Apr. 1, 1959
5 Claims. (Cl. 10—101)

The present invention has for its object a lathe threading machine or lathe provided with a threading device in which the thread cutting tool is carried by a tool-holder support displaceable parallelly to the axis of the spindle carrying the workpiece. Said device is characterized by the fact that it constitutes a deburring lathe tool and that it comprises a deburring tool mounted on the tool-holder support and is displaceable with respect to the thread-cutting lathe tool in a plane perpendicular to the spindle axis, and by the fact that a control device effects the displacements of the deburring tool as a function of the displacements of said tool-holder support for the setting into and out of action of the deburring tool at the beginning and at the end of every threading cut of the thread, so as to have the burr removed at the beginning and at the end of said thread.

It is the object of the device according to the invention to effect the cutting and removal of the burr of the threads in a single operation and to eliminate thus the finishing operation generally required for the burr removing from the threads after their cutting.

The accompanying drawings represent, schematically and by way of example, an embodiment of the device according to the invention.

Figure 3:
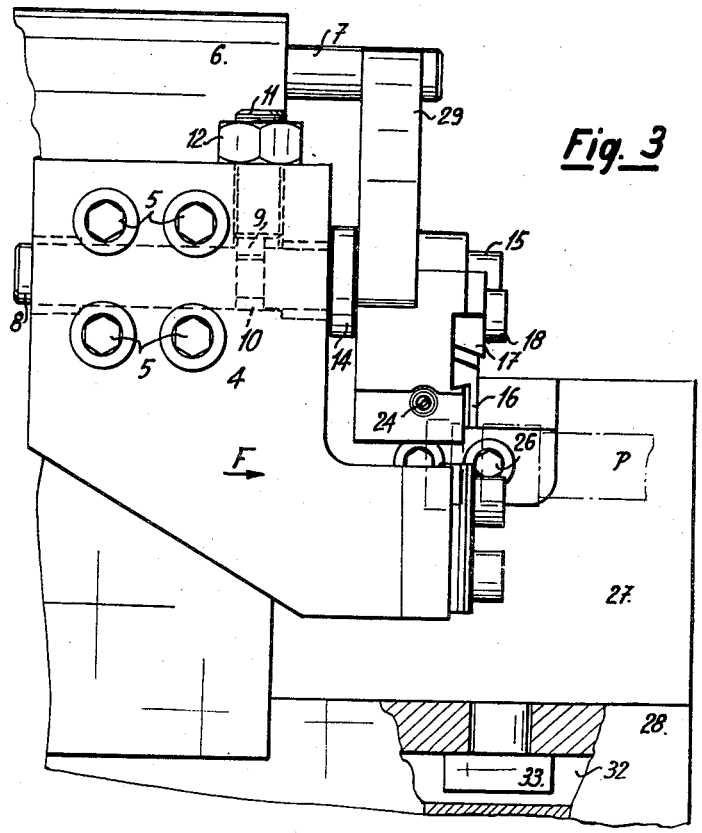
Figure 4:
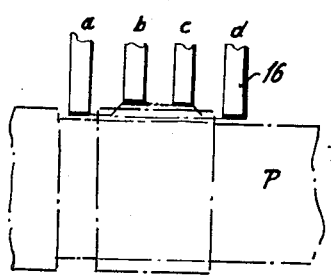
Figure 5:
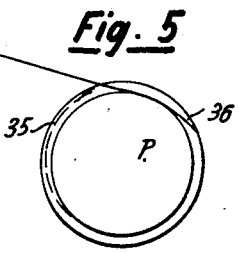
Figure 6:
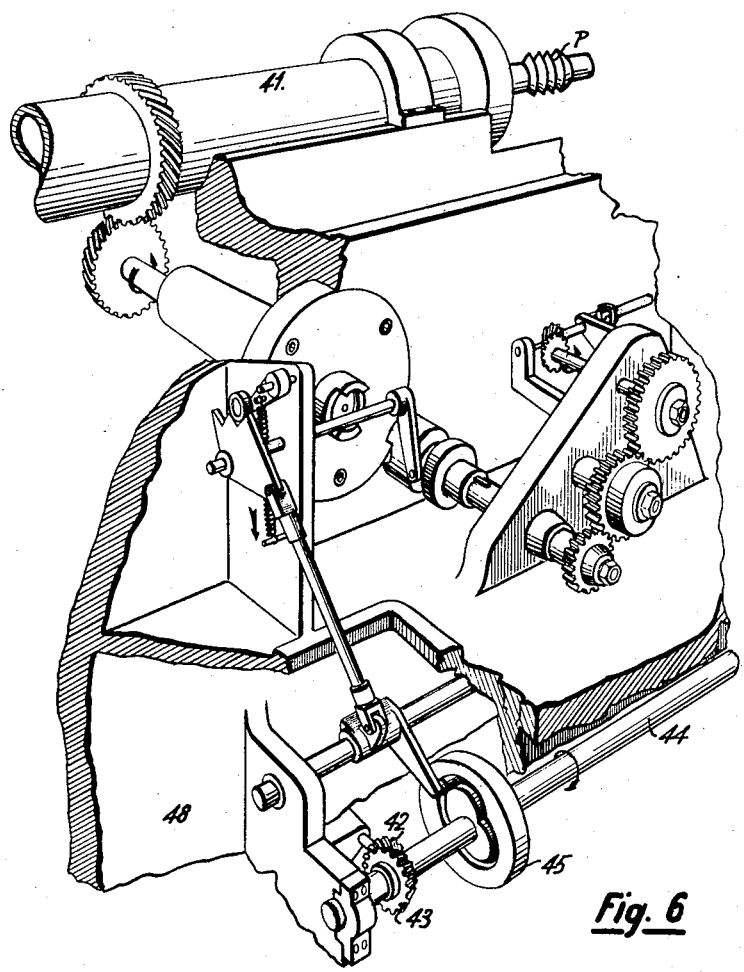
Figure 7:
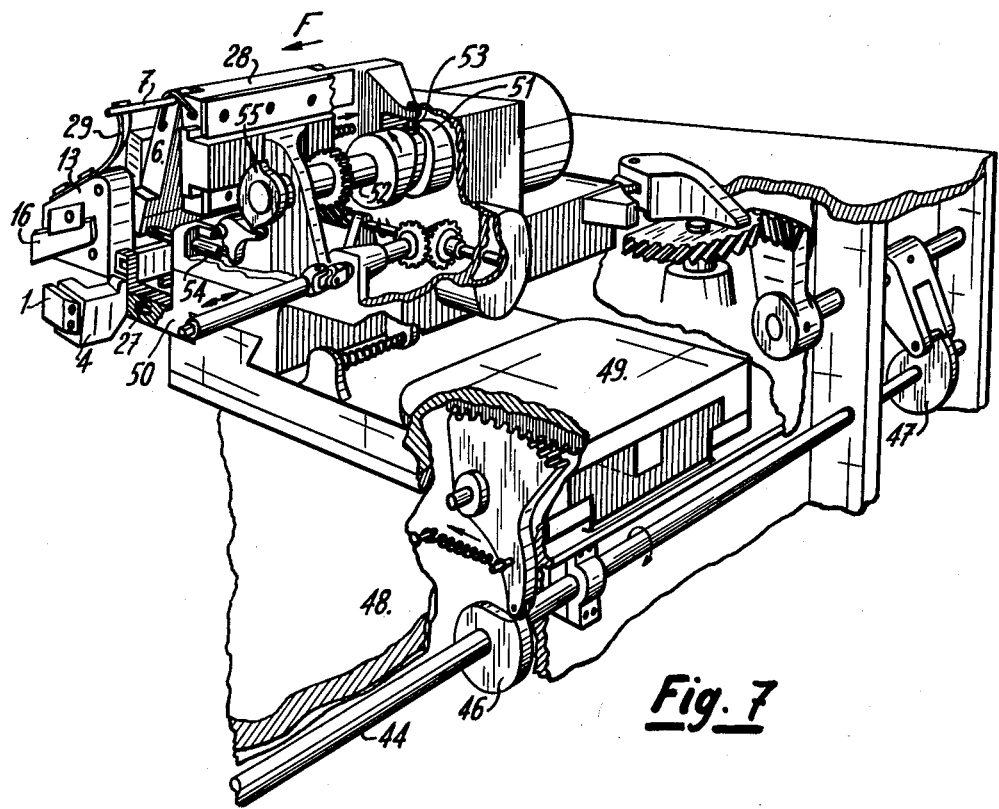

FIG. 1 is a side view thereof partially broken away.
FIG. 2 is a plan view partially broken away of FIG. 1.
FIG. 3 is a front view thereof.
FIG. 4 is a detail view on a larger scale showing different positions of the burr removing tool with respect to the thread.
FIG. 5 is an end view of a threaded piece.
FIGS. 6 and 7 are perspective views and partially in section of the left hand part and of the right hand part of a threading lathe provided with the device according to the invention.

A thread cutting lathe tool 1 is fixed with the aid of a plate 2 and of screws 3 on the side of an arm 4 fixed by screws 5 on a movable support or flap 6 pivoting on a shaft 7 made fast with a tool-holder support constituted by a longitudinal auxiliary slide 28 (FIG. 7) displaceable parallelly to the axis of the workpiece carrying spindle. The displacements of said tool-holder are adapted to be controlled through a control device described in the U.S. patent applications Ser. No. 801,255 now abandoned and Ser. No. 849,969, filed October 30, 1959 or any other known control device. The arm 4 comprises at its upper part a longitudinal bore in which is rotatively mounted a shaft 8 (FIG. 3) secured in axial position by a cylindrical test portion 9 engaging a groove 10 of the shaft 8. The test portion 9 comprises the eccentric end of an adjusting screw 11 screwed in a threaded bore made in the arm 4 and locked by a nut 12. Through angular displacement of said screw 11, the user has the possibility of adjusting the axial position of the shaft 8.

The shaft 8 includes, on the right hand side of FIG. 3, a portion projecting out of the arm 4 on which is fixed a deburring tool-holder comprising an oscillating support 13 tightened between a collar 14 of the shaft 8 and a locking screw 15. Said oscillating support 13 carries a deburring lathe tool 16 (FIG. 1) fixed by a plate 17 and a locking screw 18.

The position of the deburring tool 16, parallelly to the axis of the spindle 41 of the lathe (FIG. 6) and with respect to the thread cutting tool 1 mounted on the flap 6, is adapted to be adjusted with the aid of the screw 11. The oscillation of the support 13 is controlled by a control device constituted by a pusher 19 provided with a roller 21 co-operating with a fixed cam 25. The roller 21 is mounted in the support 13 with the aid of a strap 20 fixed in a bore 22 of the support 13 by means of a locking screw 23. An adjusting screw 24, screwed in the bottom of the bore 22, permits, by unscrewing the locking screw 23, the adjustment of the axial position of the pusher 19 with respect to the oscillating support 13.

The fixed cam 25 is disposed longitudinally, that is to say parallelly to the lathe spindle axis and fixed by screws 26 on a support 27 of the machine, independent of the auxiliary slide 28 carrying the thread cutting and the deburring tools. A plate spring 29, secured to the upper portion of the oscillating support 13 by screws 30 and bearing by its free end on an extension of the pivoting axis 7 carrying the flap 6, tends to cause the support 13 to pivot in the direction of the arrow $f_1$ and to hold thus the roller 21 in contact with the fixed cam 25. The cam support 27 is mounted in a longitudinal guide 32 parallel to the spindle axis, along which it is adapted to be displaced with the aid of means not shown for adjusting the longitudinal position of the cam 25. The cam support 27 is then secured in the chosen position by a locking screw 33 and a nut 34.

In the case of a machine comprising a cross-slide carriage, such as the threading lathe shown in FIGS. 6 and 7, the cam support 27 is mounted on one of the slides of said carriage, for example the upper slide 50 (FIG. 7). The lathe includes a spindle 41 on which is mounted a workpiece P to be threaded and which is driven in rotation by a motor, not shown, which drives also a cam-shaft 44 carrying cams 45, 46 and 47. On the bed 48 is mounted a lower transverse slide 49 actuated by the cam 46 and on which travels the longitudinal upper slide 50 actuated by the cam 47. On said slide 50 is mounted a threading device comprising a tool-holder support (or auxiliary slide) 28 longitudinally displaceable with respect to the upper slide 50. The displacements of said slide 28 are controlled by a grooved cam 51 fixed on a shaft 52 and a pusher 53 carried by the auxiliary slide 28 and engaging said groove. The auxiliary slide 28, as already described, carries a shaft 7, parallel to the axis of the spindle 41 of the lathe, on which is articulated the flap 6 carrying the arm 4 to which is fixed the thread cutting tool 1. A pusher 54, mounted on the longitudinal upper slide 50 and actuated by a cam 55 fixed on the shaft 52 of the threading device, imparts to the flap 6, and consequently to the thread cutting tool 1, at the beginning and at the end of every cut, a displacement perpendicular to the axis of the spindle 41 to cause the thread cutting tool 1 to engage, at the beginning of the working travel, the workpiece P to be threaded and to get clear at the working travel end. The shaft 2 driving the cams 51 and 55 is actuated by the spindle 41 of the lathe by the intermediary of a kinematic connection of known type which there is no need to describe here more in detail.

The lathe is further provided with the deburring tool 16, mounted on the auxiliary slide 28 as above described and adapted to oscillate in a plane perpendicular to the axis of the spindle 41 under the action of the longitudinal cam 25 carried by the support 27 which is mounted on the longitudinal upper slide 50 of the lathe.

The operation of the described device is as follows:

A workpiece P to be threaded is mounted on the machine, which comprises generally, as shown in FIGS. 6 and 7, a cross-slide carriage, the upper slide 50 of which carries the longitudinal auxiliary slide 28. A thread cutting tool 1 and a deburring tool 16 are fixed respectively on the arm 4 and on the oscillating support 13 mounted on the flap 6 of the auxiliary slide 28, so that, when the cross-slide carriage is brought into working position to carry out the first cut, the thread cutting tool 1 occupies the cut starting position shown in FIGS. 1 and 2 and the deburring tool 16 occupies the position $a$ shown in FIG. 4, leaving a radial play and a longitudinal play chosen by the operator between the tool 16 and the workpiece P. The cam 25, having a determined profile, is secured to the support 27 and the longitudinal position of said cam with respect to the thread to be cut is adjusted by locking the support 27 with the aid of the screw 33 and of the nut 34 in a corresponding position. By adjusting the axial position of the pusher 19 with the aid of the adjusting screw 24, the operator can modify at will the radial play between the tool 16 and the workpiece P. The position of the tool 16 in direction of the spindle axis is adjusted with the aid of the screw 11 so as to obtain the desired lag between the beginning of the thread cutting and the beginning of the burr removing.

The longitudinal auxiliary slide 28 carrying the flap 6 is then actuated in the direction of the arrow F (FIGS. 2, 3 and 7) and the tool 1 performs the first cut of the thread. At the beginning of said operation, the cam 25 causes an oscillation of the support 13, so as to clear the deburring tool from the thread. The tool 16 passes then from the position $a$ to the position $b$ (FIG. 4). At the end of travel of the thread cutting tool 1, the cam 25 causes the reengaging of the deburring tool 16 which passes from the position $c$ to the position $d$. According to the shape of the slopes $o$ and $p$ of the cam 25, the deburring tool cuts different shapes of entrance and exit of the thread (conical, rounded, etc.).

In certain cases, the portion $m$ of the cam 25 can be designed so that the tool 16 lowers the external crest of the thread profile. The disengagement of the thread cutting tool 1 at the cut end and its resetting into cutting position for the next cut are operated in known manner by pivoting of the flap 6 on the shaft 7 of the auxiliary slide 28, firstly in the direction of the arrow $f_2$, and then in the opposite direction of said arrow (see U.S. patent application Ser. No. 801,255 and Ser. No. 849,969 mentioned above). The oscillating support 13 carrying the deburring tool 16 is constantly held in contact with the cam 25 by the pressure of the return spring 29, so that the position of said tool 16 with respect to the workpiece P to be threaded is not appreciably modified during the pivoting of the flap 6 on the shaft 7 between two machining cuts, though the shaft 8 on which said support 13 is mounted takes part with the arm 4 in the pivoting of the flap 6.

In the FIG. 5, dotted profile 35 shows the sharp and fragile end of the thread being present at the entrance and at the exit of the thread and which it is useful to suppress by removing its burr. Thus, the entrance and the exit of the thread are carried back onto a stronger cross-section of the thread illustrated by the full line 36.

In the described embodiment, the control device causing the actuation of the deburring tool includes a pusher provided with a roller co-operating with a cam, but it is clear that any other types of control, for example hydraulic or electric, may also be utilized.

The device according to the present invention is particularly adapted for mounting on an automatic threading lathe of the type described in the above mentioned patent applications. However, the application of said device on threading machines or on other types of automatic threading lathes may be provided without departing from the scope of the present invention.

I claim:

1. In an automatic lathe provided with a threading device, a workpiece carrying spindle, a movable tool-holder support, a threadcutting lathe tool carried by said tool-holder support, and means for displacing said tool-holder support parallelly to the axis of said spindle, the combination of a deburring lathe tool mounted on said tool-holder support in approximatively the same plane but angularly displaced with respect to said thread cutting tool, means for displacing said deburring lathe tool with respect to said thread cutting lathe tool in a plane perpendicular to said spindle axis, a control device controlling said displacements of said deburring lathe tool, a transverse pusher made fast with said deburring lathe tool, a fixed cam, said cam being independent of the tool-holder support, means for adjusting the position of said cam parallelly to said spindle axis, means for adjusting the axial position of said pusher perpendicularly to said spindle axis and with respect to the deburring lathe tool, said pusher and said cam co-operating one with another to constitute said control device controlling said displacements of said deburring lathe tool with respect to said thread cutting lathe tool, a movable support carried by said tool-holder support, and means for displacing said movable support with respect to said tool-holder support perpendicularly to said spindle axis, said movable support carrying said thread cutting lathe tool and said deburring lathe tool, said deburring lathe tool being adapted to be displaced with respect to said movable support perpendicularly to said spindle axis, said control device controlling the displacements of said deburring lathe tool, with respect to said thread cutting lathe tool in timed relation to the displacements of said tool-holder support and causing the setting into and out of action of said deburring lathe tool at the beginning and at the end of every threading cut of the thread, cutting lathe tool so as to have the burr removed at the beginning and at the end of said thread.

2. An automatic lathe as claimed in claim 1, comprising further a cross-slide carriage, said fixed cam being mounted on one of the slides of said carriage.

3. In an automatic lathe provided with a threading device, a workpiece-carrying spindle, a movable tool-holder support, a thread-cutting lathe tool carried by said tool-holder support, and means for displacing said tool-holder support parallelly to the axis of said spindle; the combination of a deburring lathe tool mounted on said tool holder support in approximatively the same plane but angularly displaced with respect to said thread cutting tool for relative movement in a plane perpendicular to the spindle axis with respect to said thread-cutting tool, means for displacing said deburring tool with respect to said thread-cutting tool at the beginning and at the end of every threading cut from a inoperative to an operative position in which it removes the burr of the thread at both ends thereof, and a control device controlling said displacement of said deburring tool in timed relation with the displacement of said tool-holder support.

4. In an automatic lathe provided with a threading device, a workpiece-carrying spindle, a movable tool-holder support, means for displacing said tool-holder support parallelly to the axis of said spindle, a movable support carried by said tool-holder support, means for displacing said movable support with respect to said tool-holder support perpendicularly to said spindle axis, and a thread-cutting lathe tool carried by said movable support; the combination of a deburring lathe tool mounted on said movable support in approximatively the same plane but angularly displaced with respect to said thread cutting tool for relative movement with respect to said thread-cutting tool in a plane parallel to said spindle axis, means for displacing said deburring tool at the beginning and at the end of each threading cut from an inoperative to an operative position in which it removes the burr of the thread at both ends thereof, and a control device controlling the displacement of said deburring tool between its two extreme positions in timed relation with respect to the displacement of said tool-holder support.

5. An automatic lathe according to claim 4 wherein said control device includes means for adjusting the position of said deburring tool with respect to said thread-cutting tool parallelly to said spindle axis for modifying the timed relation between the displacement of said tool-holder support and said movement of said deburring tool.

References Cited in the file of this patent

UNITED STATES PATENTS

| | | |
|---|---|---|
| 1,428,075 | Breckenridge | Sept. 5, 1922 |
| 2,383,266 | LeTourneau | Aug. 21, 1945 |

OTHER REFERENCES

Shmueli: "Last Thread Deburring Device," page 70 of vol. 18, No. 4 of Automatic Machining, February 1957.